(12) United States Patent
Watanabe

(10) Patent No.: US 12,468,732 B2
(45) Date of Patent: Nov. 11, 2025

(54) INFORMATION PROCESSING DEVICE, INFORMATION PROCESSING METHOD, AND RECORDING

(71) Applicant: NEC Corporation, Tokyo (JP)

(72) Inventor: Yuuki Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/287,079

(22) PCT Filed: Aug. 7, 2023

(86) PCT No.: PCT/JP2023/028677
§ 371 (c)(1),
(2) Date: Oct. 16, 2023

(87) PCT Pub. No.: WO2024/157498
PCT Pub. Date: Aug. 2, 2024

(65) Prior Publication Data
US 2025/0077546 A1    Mar. 6, 2025

(30) Foreign Application Priority Data
Jan. 27, 2023    (WO) .................. PCT/JP2023/002569

(51) Int. Cl.
*G06F 17/00* (2019.01)
*G06F 16/28* (2019.01)
*G06N 20/00* (2019.01)

(52) U.S. Cl.
CPC .......... *G06F 16/284* (2019.01); *G06N 20/00* (2019.01)

(58) Field of Classification Search
CPC ....... G06F 16/284; G06F 16/28; G06N 20/00; G06N 5/022
See application file for complete search history.

(56) References Cited

U.S. PATENT DOCUMENTS

| 9,836,183 B1 | 12/2017 | Love et al. |
| 2020/0250562 A1 | 8/2020 | Bly |

(Continued)

FOREIGN PATENT DOCUMENTS

| JP | 5220629 B2 | 6/2013 |
| JP | 2019-153271 A | 9/2019 |

(Continued)

OTHER PUBLICATIONS

Kumar Sharad. True Friends Let You Down: Benchmarking Social Graph Anonymization Schemes. In Proceedings of the 2016 ACM Workshop on Artificial Intelligence and Security. Association for Computing Machinery, 93-104. <https://doi.org/10.1145/2996758.2996765>, Oct. 2016.*

(Continued)

*Primary Examiner* — Greta L Robinson

(57) ABSTRACT

In the information processing device, the training means trains a learning model using graph data and relationship data. The graph data includes a plurality of nodes corresponding to a plurality of contents, and the graph data is provided with attribute data indicating attributes of the plurality of nodes. The relationship data indicates known relationships between the nodes linked in the graph data. The analysis means performs an analysis for identifying contents optimized for a keyword inputted by a user, by using the trained learning model. The display information generation means generates a graph for showing an analysis result obtained by the analysis together with a basis, and generates a display information in which an icon corresponding to the attribute of each node is applied to each node constituting the basis in the graph. The information processing device can be used for user's decision making relating to healthcare.

4 Claims, 12 Drawing Sheets

(56) References Cited

U.S. PATENT DOCUMENTS

| | | |
|---|---|---|
| 2020/0394223 A1 | 12/2020 | Nishimura et al. |
| 2020/0401590 A1 | 12/2020 | Staar et al. |
| 2021/0383395 A1* | 12/2021 | Galka ................ G06Q 20/0655 |

FOREIGN PATENT DOCUMENTS

| | | |
|---|---|---|
| JP | 2022-523917 A | 4/2022 |
| JP | 2022-536889 A | 8/2022 |

OTHER PUBLICATIONS

International Search Report for PCT Application No. PCT/JP2023/028677, mailed on Sep. 26, 2023.

* cited by examiner

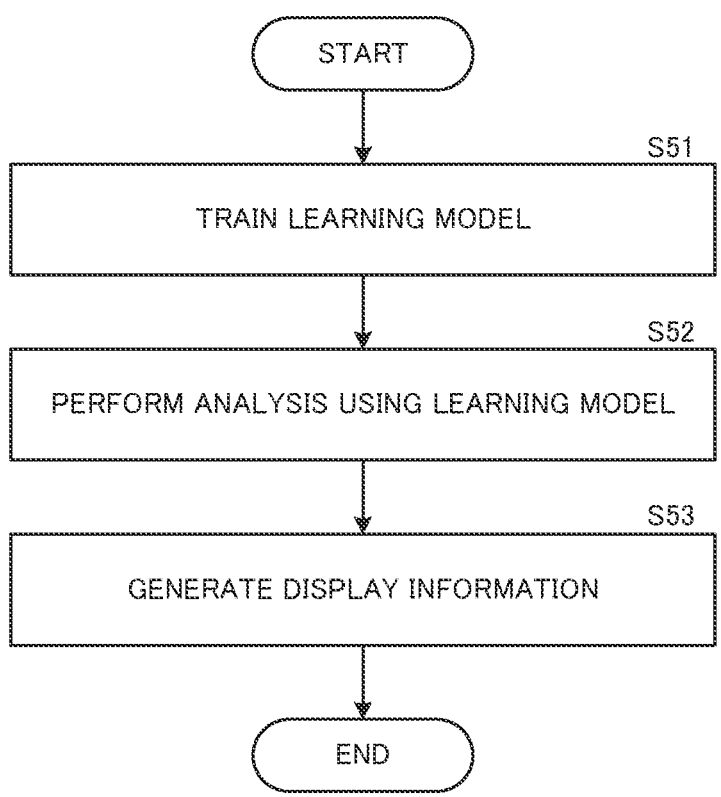

INFORMATION PROCESSING DEVICE, INFORMATION PROCESSING METHOD, AND RECORDING

This application is a National Stage Entry of PCT/JP2023/028677 filed on Aug. 7, 2023, which claims priority from Japanese Patent Application PCT/JP2023/002569 filed on Jan. 27, 2023, the contents of all of which are incorporated herein by reference, in their entirety.

TECHNICAL FIELD

The present disclosure relates to techniques for performing processing using graph data.

BACKGROUND ART

Graph data, such as a knowledge graph, is conventionally known as data that can express relationships between multiple entities. Graph data has also recently been utilized, for example, for the purpose of recommendation of contents to users.

For example, Patent Document 1 discloses a content graph in which nodes indicating contents are connected by edges and the correlation between contents is abstracted. Also, Patent Document 1 discloses a community graph in which a group of contents in the content graph is replaced with one node as a community. Further, Patent Document 1 discloses a viewpoint of calculating the shortest path connecting two contents in the community graph based on the two contents specified by the user and presenting the calculated contents on the shortest path.

PRECEDING TECHNICAL REFERENCES

Patent Document

[Patent Document 1] Japanese Patent No. 5220629

SUMMARY

Problem to be Solved

However, according to the technique disclosed in Patent Document 1, for example, when checking the detailed information of one content on the shortest path, there is such a problem that the operation for specifying the one content is required.

That is, according to the technique disclosed in Patent Document 1, there is such an issue in accordance with the aforementioned problem that the procedure for the user to grasp the basis of presenting the content to the user becomes complicated.

It is an object of the present disclosure to provide an information processing device by which a user can intuitively grasp a basis of presenting the content to the user.

Means for Solving the Problem

According to an example aspect of the present invention, there is provided an information processing device comprising:
  a training means configured to train a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data;
  an analysis means configured to perform an analysis for identifying contents optimized for a keyword inputted by a user, by using the trained learning model; and
  a display information generation means configured to generate a graph for showing an analysis result obtained by the analysis together with a basis, and generate a display information in which an icon corresponding to the attribute of each node is applied to each node constituting the basis in the graph.

According to an example aspect of the present invention, there is provided an information processing method comprising:
  training a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data;
  performing an analysis for identifying contents optimized for a keyword inputted by a user, by using the trained learning model; and
  generating a graph for showing an analysis result obtained by the analysis together with a basis, and generate a display information in which an icon corresponding to an attribute of each node is applied to each node constituting the basis in the graph.

According to an example aspect of the present invention, there is provided a recording medium storing a program, the program causing a computer to execute:
  training a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data;
  performing an analysis for identifying contents optimized for a keyword inputted by a user, by using the trained learning model; and
  generating a graph for showing an analysis result obtained by the analysis together with a basis, and generate a display information in which an icon corresponding to an attribute of each node is applied to each node constituting the basis in the graph.

Effect

According to the present disclosure, the user can intuitively grasp the basis of presenting the content to the user.

BRIEF DESCRIPTION OF THE DRAWINGS

FIG. 12 is a flowchart for explaining processing performed in the information processing device according to the second example embodiment.

EXAMPLE EMBODIMENTS

Preferred example embodiments of the present invention will be described with reference to the accompanying drawings.

First Example Embodiment

[System Configuration]

Figure 1:
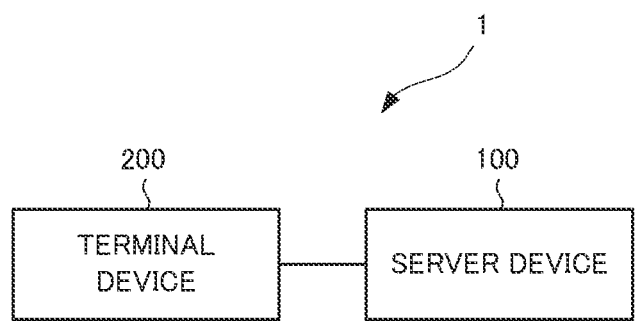
FIG. 1 is a diagram showing a schematic configuration of an information processing system including a server device according to a first example embodiment.

FIG. 1 is a diagram illustrating a schematic configuration of an information processing system including a server device according to a first example embodiment. The information processing system 1 includes a server device 100 and a terminal device 200, as shown in FIG. 1.

The server device 100 is configured to be able to communicate with the terminal device 200. Also, the server device 100 acquires an analysis result relating to the content optimum for the keyword inputted by the user by performing analysis using a learning model to be described later, for example. Further, the server device 100 generates a display information for displaying the above-described analysis result together with a basis, and outputs the generated display information to the terminal device 200.

The terminal device 200 includes a function for communicating with the server device 100, a function for inputting information transmitted to the server device 100, and a function for displaying information received from the server device 100. Also, the terminal device 200 has a function of displaying information according to the operation of the user. Specifically, the terminal device 200 may be constituted by a device such as a personal computer, a smart phone, and a tablet type computer, for example.

[Hardware Configuration]

Figure 2:
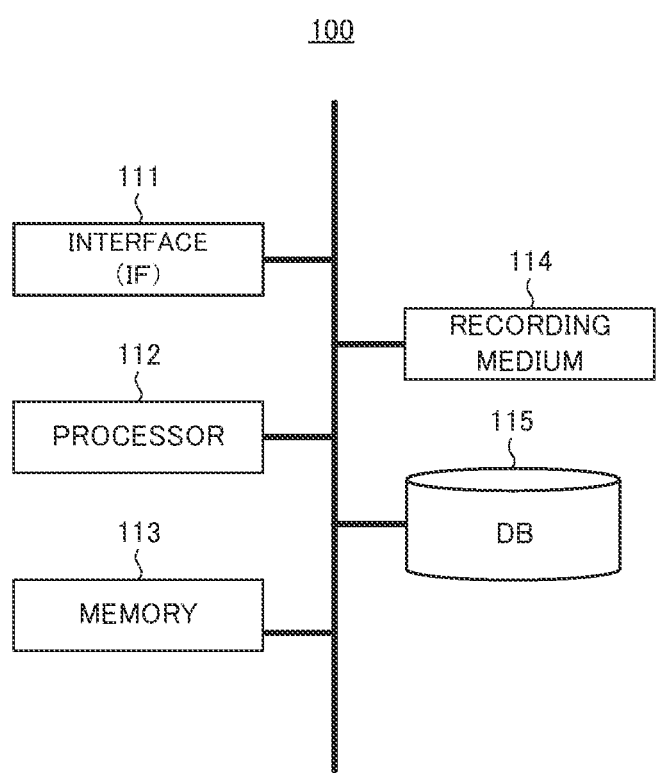
FIG. 2 is a block diagram showing a hardware configuration of a server device according to the first example embodiment.

FIG. 2 is a block diagram illustrating a hardware configuration of the server device according to the first example embodiment. As illustrated in FIG. 2, the server device 100 includes an interface (IF) 111, a processor 112, a memory 113, a recording medium 114, and a database (DB) 115.

The IF 111 inputs and outputs data to and from external devices. For example, the data transmitted from the terminal device 200 is inputted to the server device 100 through the IF 111.

The processor 112 is a computer such as a CPU (Central Processing Unit) and controls the entire server device 100 by executing a program prepared in advance. Specifically, the processor 112 performs analysis using, for example, a trained model described below.

The memory 113 may include a ROM (Read Only Memory), a RAM (Random Access Memory), and the like. The memory 113 is also used as a working memory during various operations by the processor 112.

The recording medium 114 is a non-volatile and non-transitory recording medium such as a disk-like recording medium or a semiconductor memory and is configured to be detachable from the server device 100. The recording medium 114 records various programs executed by the processor 112. When the server device 100 executes various kinds of processes, the program recorded in the recording medium 114 is loaded into the memory 113 and executed by the processor 112.

The DB 115 stores, for example, information entered through the IF 111 and processing results obtained by the processing of the processor 112.

[Functional Configuration]

Figure 3:
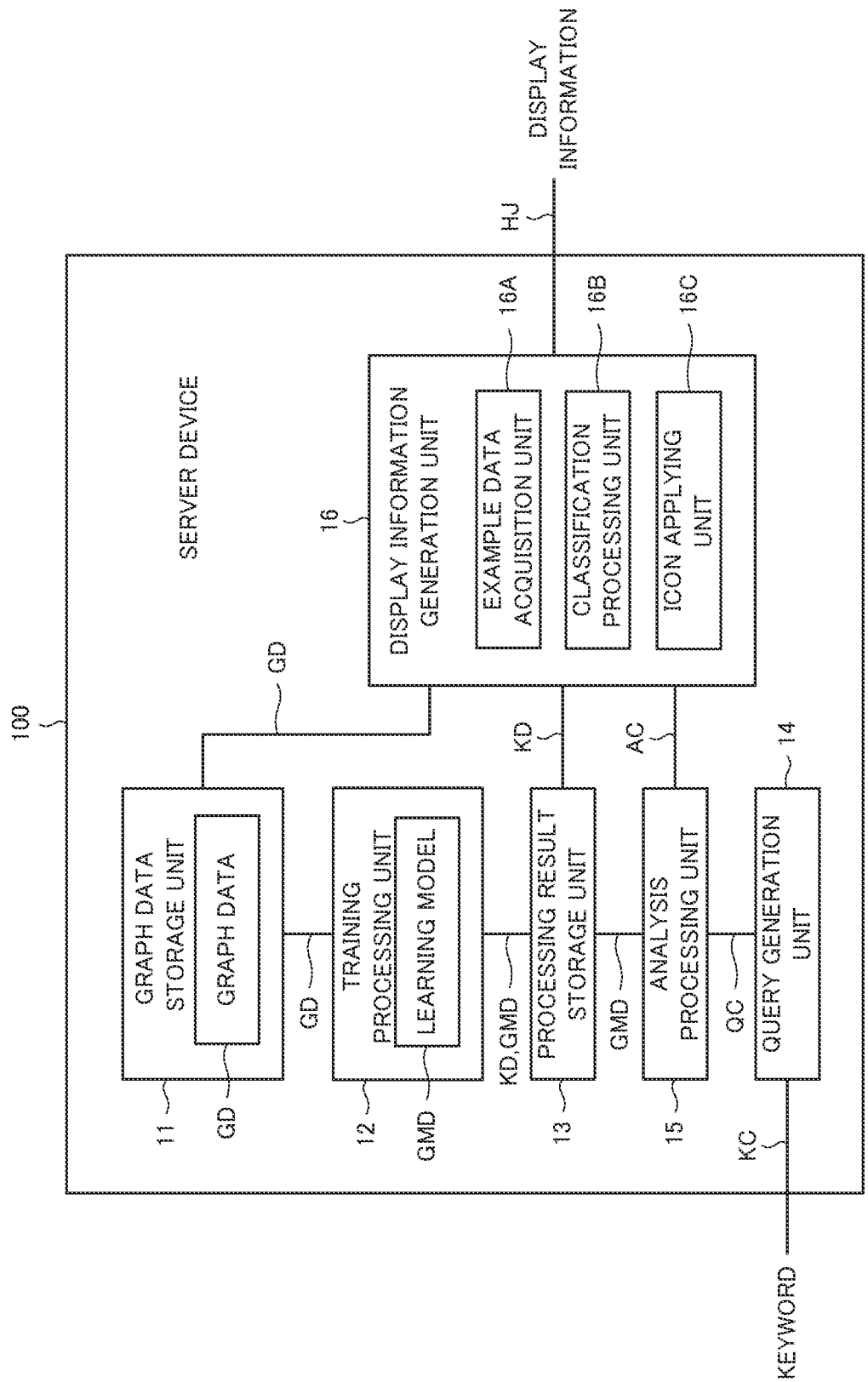
FIG. 3 is a block diagram showing a functional configuration of the server device according to the first example embodiment.

FIG. 3 is a block diagram illustrating a functional configuration of the server device according to the first example embodiment. As shown in FIG. 3, the server device 100 includes a graph data storage unit 11, a training processing unit 12, a processing result storage unit 13, a query generation unit 14, an analysis processing unit 15, and a display information generation unit 16.

The graph data storage unit 11 stores a graph data GD including a plurality of nodes corresponding to a plurality of contents. The content in the present example embodiment can be represented as a character string in the node included in the graph data. The nodes included in the graph data GD are linked by arrows indicating the relationships between the nodes. The aforementioned arrows may be referred to as edges.

A plurality of nodes included in the graph data GD are provided with attribute data indicating the attributes of the plurality of nodes. Specifically, for example, the "Bacon" node included in the graphical data GD is given attribute data indicating "Meat." Also, for example, attribute data indicating "Vegetable" is assigned to the node "Carrot" included in the graph data GD. "Bacon" and "Carrot" correspond to the contents represented by the character strings in the nodes included in the graph data GD.

The training processing unit 12 has a function as a training means. The training processing unit 12 acquires data indicating a known relationship between the linked nodes in the graph data GD read from the graph data storage unit 11 as the relationship data KD. The relationship data KD includes data showing the relationships among the plurality of nodes as universal rules by replacing the plurality of nodes having the same relationship with a variable node. In addition, the training processing unit 12 performs training of the learning model GD using the graph data GD and the relationship data KD so as to derive an unknown relationship between the nodes that are not linked to each other in the graph data GD. The training processing unit 12 stores the relationship data KD and the trained model GMD in the processing result storage unit 13.

The processing result storage unit 13 stores the relationship data KD and the trained model GMD as the data obtained by the processing of the training processing unit 12.

The query generation unit 14 generates a query QC corresponding to the keyword KC inputted from the terminal device 200.

The analysis processing unit 15 has a function as an analysis means. The analysis processing unit 15 performs analysis of the query QC generated by the query generation unit 14 using the trained model GMD read from the processing result storage unit 13. Specifically, the analysis processing unit 15 performs an analysis for specifying the content that is optimized for the keyword KC inputted by the user, for example, as the analysis relating to the above-described query QC. The analysis processing unit 15 outputs the analysis result AC obtained by the above-described analysis to the display information generation unit 16.

The display information generation unit 16 has a function as a display information generation means. The display information generation unit 16 generates a display information HJ based on the graph data GD read from the graph data storage unit 11, the relationship data KD read from the processing result storage unit 13, and the analysis result AC obtained by the analysis processing unit 15, and outputs the generated display information HJ to the terminal device 200. The display information generation unit 16 includes an example data acquisition unit 16A, a classification processing unit 16B, and an icon applying unit 16C.

The example data acquisition unit 16A extracts, from among the rules included in the relationship data KD read from the processing result storage unit 13, a rule serving as a basis for the analysis result AC obtained by the analysis processing unit 15. The example data acquisition unit 16A identifies a part where the rule extracted as described above is satisfied from the graph data GD read from the graph data storage unit 11, and acquires example data ED corresponding to the data of the identified part.

The classification processing unit 16B classifies, among the nodes included in the example data ED, a plurality of nodes having the same relationship with each other and to which the same attribute data is given as a node group. The classification processing unit 16B acquires the example data EDH by modifying the example data ED so that the nodes belonging to one node group classified as described above are arranged in an overlapping manner.

The icon applying unit 16C generates the display information HJ by applying an icon corresponding to the attribute data of each node to the nodes arranged in the foreground in the example data EDH. The icon applying unit 16C outputs the display information HJ generated as described above to the terminal device 200. According to this process, it is possible to display the display informational HJ on the terminal device 200.

Concrete Example

Subsequently, specific examples of the processing performed in the respective units of the server device 100 will be described. The specific examples are directed to the case where the graph data storage unit stores the graph data, which include a plurality of nodes corresponding to the contents related to the food and the dish, and in which the attribute data indicating the attribute of each of the plurality of nodes is assigned to each of the plurality of nodes.

The training processing unit 12 acquires data indicating known relationships between the linked nodes in the graph data GD read from the graph data storage unit 11 as the relationship data KD. In addition, the training processing unit 12 performs training of the learning model GMD, for example, by inputting a feature quantity corresponding to each node included in the graph data GD and a feature quantity corresponding to each relationship included in the relationship data KD to the learning model GMD constructed on the basis of "KBLRN". The training processing unit 12 stores the relationship data KD and the trained learning model GMD in the processing result storage unit 13.

Incidentally, "KBLRN" described above is disclosed in Alberto Garcia-Duran, et. al, "KBLRN: End-to-End Training of Knowledge Base Representations with Latent, Relational, and Numerical Features", for example. The trained learning model GMD may be constructed on the basis of models other than "KBLRN" as long as it has a configuration to perform link prediction for graph data. In addition, when the training processing unit 12 performs training of the learning model GMD using the graph data GD and the relationship data KD, it is desirable to perform zero-shot training as disclosed in JP-A-2019-125364, the disclosure of which is incorporated herein by reference. Further, according to the specific examples, for example, each time the graph data GD is updated, re-training of the learning model GMD may be performed using the updated graph data GD.

When the keyword KW "Christmas" is inputted from the terminal device 200, for example, the query generation unit 14 generates a query QX of "New ingredient matching Christmas" as a query corresponding to the keyword KW.

The analysis processing unit 15 uses the trained learning model GMD read from the processing result storage unit 13 to perform analysis of the query QX generated by the query generation unit 14. According to such an analysis, the analysis processing unit 15 acquires the analysis result AX of "Kielbasa sausage", for example. The analysis processing unit 15 outputs the analysis result AX obtained by the analysis of the query QX to the display information generation unit 16.

Figure 4:
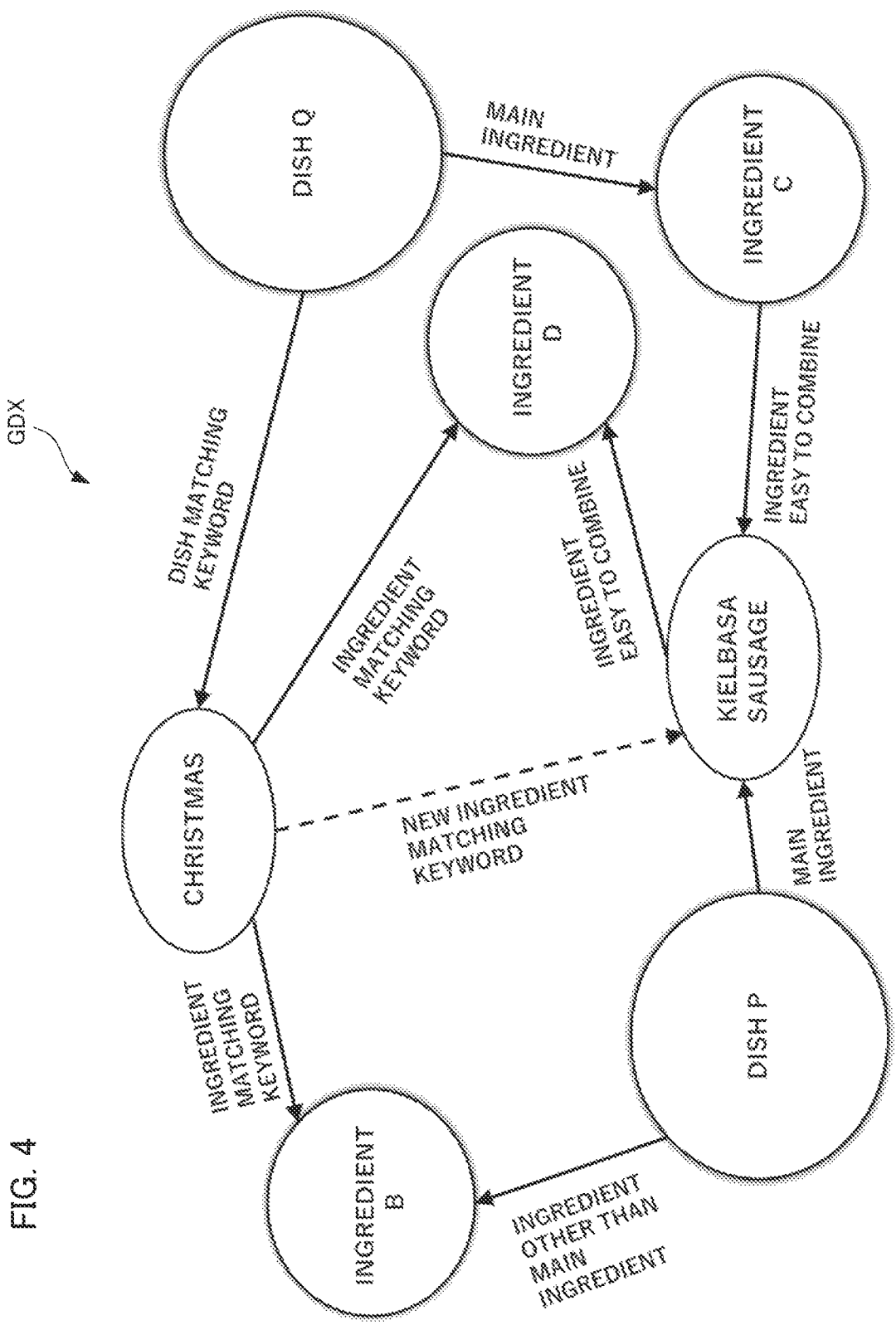
FIG. 4 is a diagram for explaining examples of a rule serving as a basis of an analysis result obtained by processing of the server device according to the first example embodiment.

The example data acquisition unit 16A extracts the rule which serves as the basis of the analysis result AX from the rules included in the relationship data KD read from the processing result storage unit 13. According to such a process, for example, rules shown in the graph data GDX of FIG. 4 are extracted. FIG. 4 is a diagram for explaining examples of the rules each serving as a basis of analysis results obtained by the processing of the server device according to the first example embodiment.

The graph data GDX includes a node "Christmas" that corresponds to the keyword KW and a node "Kielbasa sausage" that corresponds to the analysis result AX. Also, the graph data GDX includes, as the variable nodes, a node "Ingredient B" node, a node "Ingredient C", a node "Ingredient D", a node "Dish P" node, and a node "Dish Q". The graph data GDX shows that the ingredients matching Christmas are the ingredients B and D. The graph data GDX also shows that the main ingredient of Dish P is Kielbasa sausage. The graph data GDX also shows that the ingredient of Dish P other than the main ingredient is Ingredient B. The graph data GDX also shows that Kielbasa sausage is an ingredient which is easy to combine with Ingredient D. The graph data GDX also shows that Ingredient C is an ingredient which is easy to combine with Kielbasa sausage. The graph data GDX also shows that the main ingredient of Dish Q is Ingredient C. The graph data GDX also shows that Dish Q matches Christmas.

Figure 5:
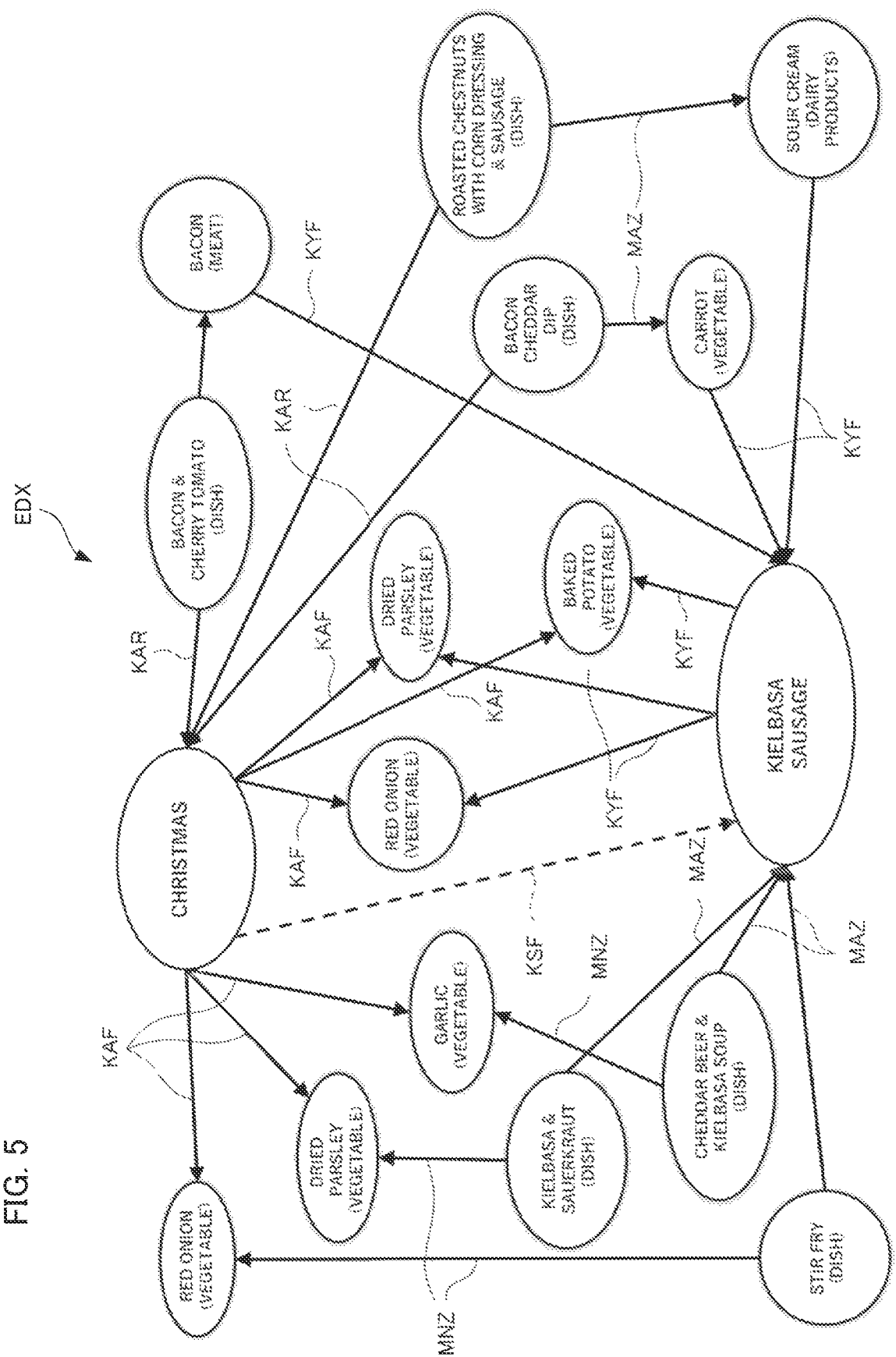
FIG. 5 is a diagram showing an example of example data acquired by the processing of the server device according to the first example embodiment.

The example data acquisition unit 16A identifies the part of the graph data GD read from the graph data storage unit 11 where the rules as shown in the graph data GDX are satisfied, and acquires the example data corresponding to the data of the identified part. According to such a process, for example, it is possible to acquire an example data EDX shown as a graph of FIG. 5. FIG. 5 is a diagram illustrating an example of example data acquired by the processing of the server device according to the first example embodiment. The character strings such as "Vegetable" and "Dish" described in parentheses in the nodes of the example data EDX indicate the attributes of the nodes. Further, in the example data EDX of FIG. 5, for convenience of illustration, the relationship between the nodes is represented as a sign. Specifically, in the example data EDX of FIG. 5, "KAF" represents "Ingredient matching keyword," "KAR" represents "Disch matching keyword," "KYF" represents "Ingredient easy to combine", "MAZ" represents "Main ingredient", "MNZ" represents "Ingredient other than main ingredient", and "KSF" represents "New ingredient matching keyword." Also, "Garlic" and "Baked potato" correspond to examples of contents represented as the character strings in the nodes included in the example data EDX of FIG. 5.

Figure 6:
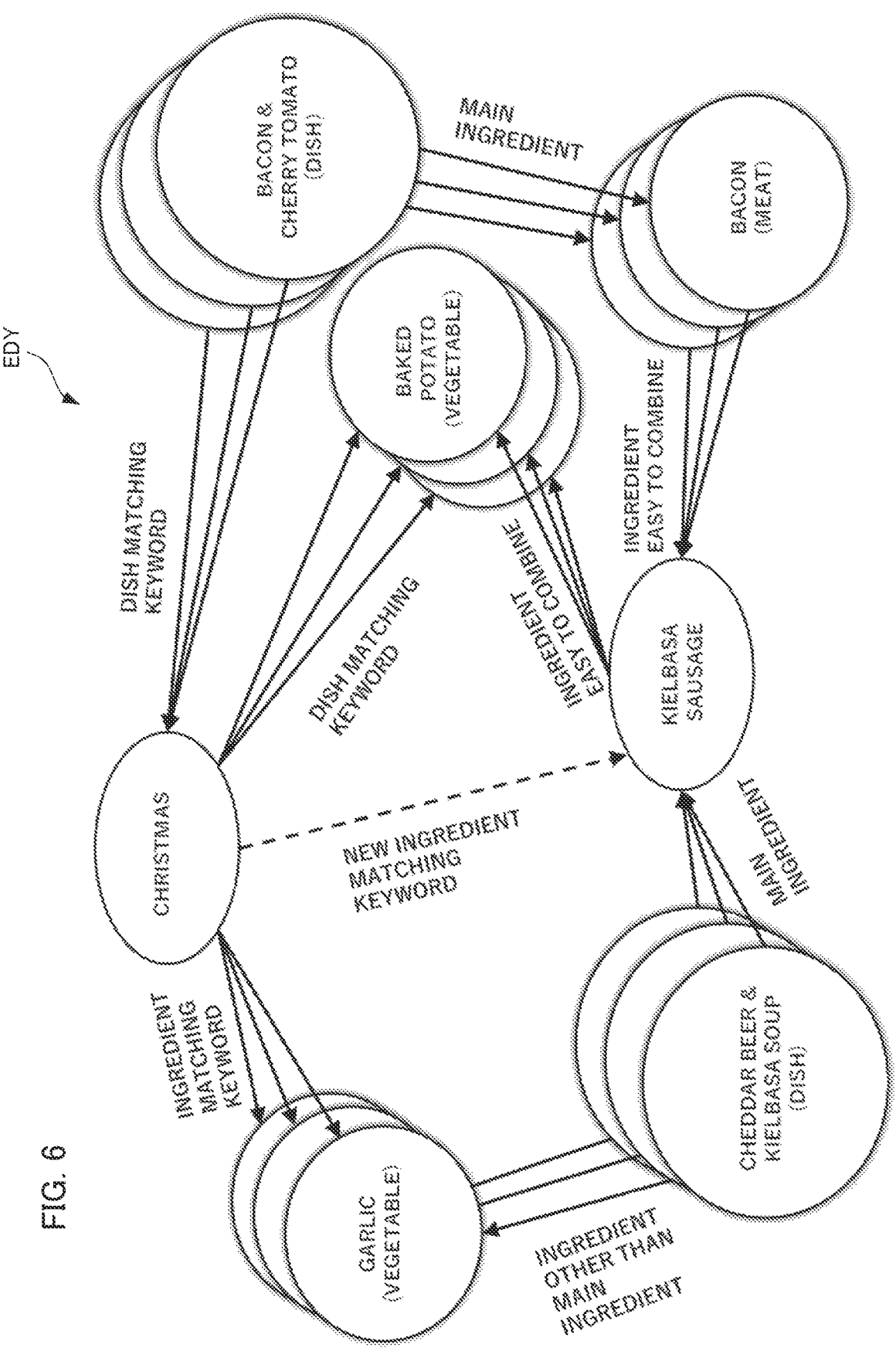
FIG. 6 is a diagram showing data obtained by classifying and modifying the example data of FIG. 5.

The classification processing unit 16B classifies, among the nodes included in the example data EDX, a plurality of nodes, which have the same relationships with each other and to which the same attribute data is given, as one node group. Also, the classification processing unit 16B modifies the example data EDX so that the nodes belonging to the same node group classified as described above are arranged in an overlapping manner, and acquires the example data EDY shown as a graph in FIG. 6, for example. FIG. 6 is a diagram showing data obtained by classifying and modifying the example data of FIG. 5.

Figure 7:
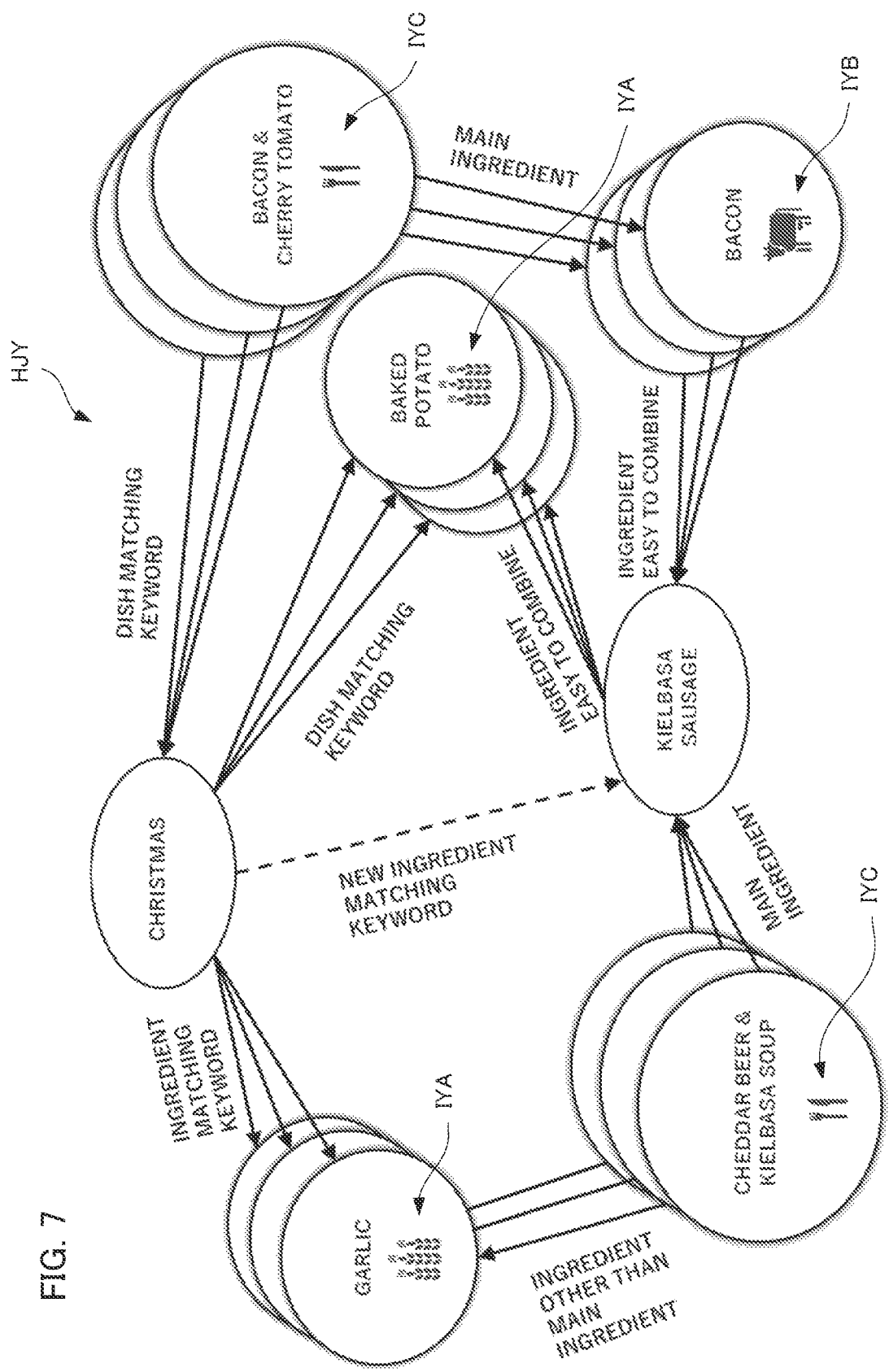
FIG. 7 shows an example of display information generated by the processing of the server device according to the first example embodiment.

The icon applying unit 16C generates a display information HJY as shown in FIG. 7, for example, by applying an icon corresponding to the attribute data of each node to each node shown in the foreground in the example data EDY. FIG. 7 is a diagram illustrating an example of the display information generated by the processing of the server device according to the first example embodiment. Also, the icon applying unit 16C outputs the display information HJY generated as described above to the terminal device 200. According to such a process, it is possible to display the display informational HJY on the terminal device 200.

According to the display information HJY of FIG. 7, instead of the character string indicating the attribute of each node included in the example data EDY of FIG. 6, an icon corresponding to the attribute of each node is applied. According to the display information HJY of FIG. 7, an icon IYA using a plant as a motif is applied to the node whose attribute is vegetable. Further, according to the display information HJY of FIG. 7, an icon IYB using a cow as a motif is applied to the node whose attribute is meat. Further, according to the display information HJY of FIG. 7, an icon IYC using a fork or a knife as a motif is applied to the node whose attribute is dish. Further, according to the display information HJY of FIG. 7, the user can grasp the reason why Kielbasa sausage is a new ingredient matching Christmas on the basis of each node included in the display information HJY and the relationships between the nodes indicated by the solid line arrows in the display information HJY.

According to the above-described processing, the display information generation unit 16 can generate the example data EDY for showing the analysis result AX obtained by the analysis of the analysis processing unit 15 together with the basis. Further, the display information generation unit 16 can generate the display information HJY in which the icons corresponding to the individual attributes of the respective nodes are applied to the nodes constituting the basis of the analysis result AX in the example data EDY. Further, the display information generation unit 16 can acquire the data of the part in the graph data GD where the relationship between the analysis result AX and the basis of the analysis result AX is established, based on the relationship data KD. Further, the display information generation unit 16 can acquire the classification result by classifying the nodes included in the example data EDX based on the relationship between the nodes and the attributes of the nodes, and generate the example data EDY by modifying the example data EDX so that the nodes belonging to one node group included in the classification result are arranged in an overlapping manner. Further, the display information generation unit 16 can generate the display information HJY in which the icons corresponding to the individual attributes of the nodes arranged in the foreground in the example data EDY are applied.

Figure 8:
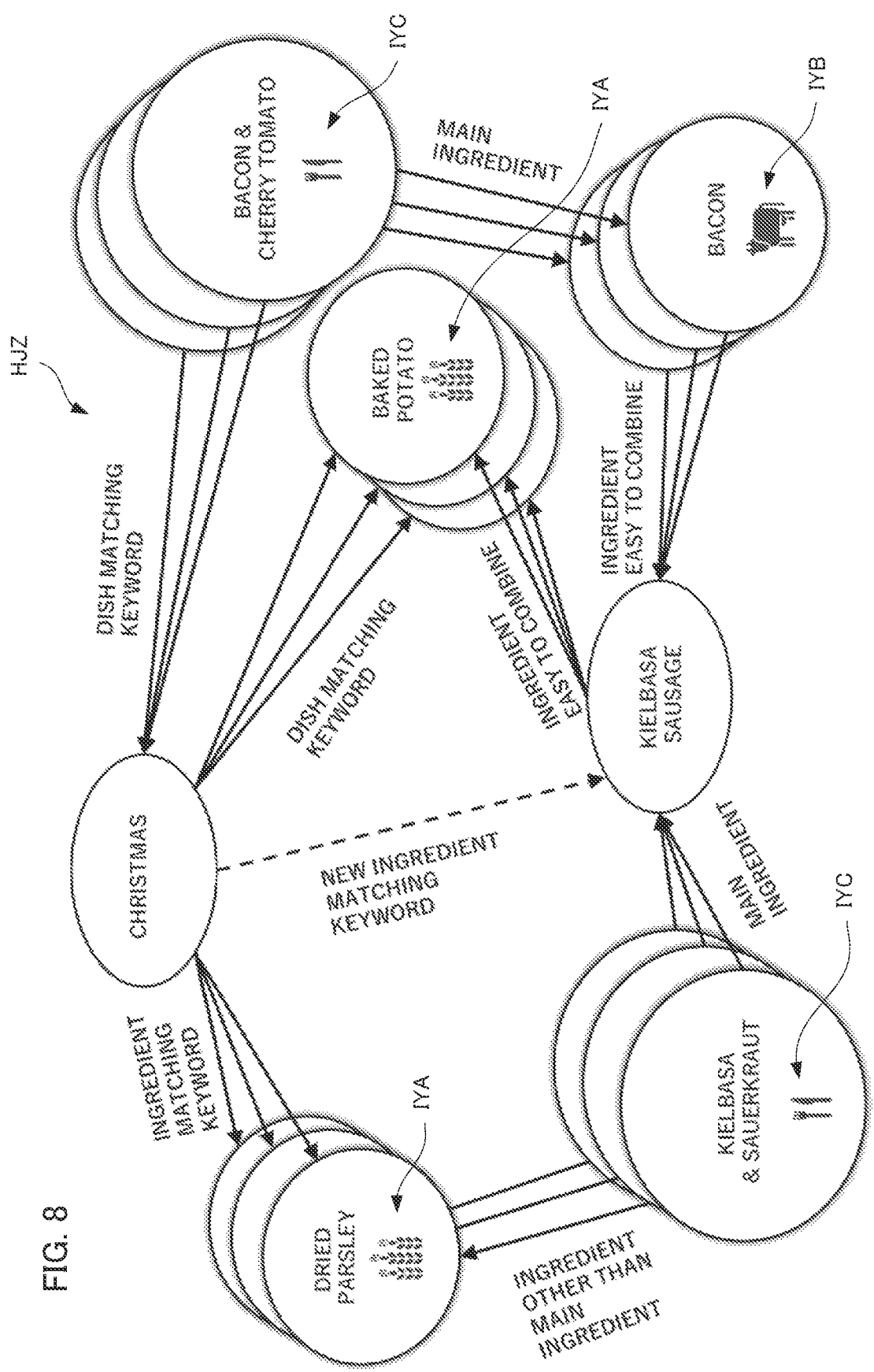
FIG. 8 shows an example of the display information generated by the processing of the server device according to the first example embodiment.

Incidentally, according to the present example embodiment, when an instruction to select the other nodes hidden behind the one node displayed in the foreground is performed in the terminal device 200, the display may be switched to show the selected other node in the foreground in place of the one node displayed in the foreground. Specifically, for example, a node hidden behind the node "Garric" in the display information HJY of FIG. 7 is selected, or one of the nodes hidden behind the node "Chedder beer & Kielbasa soup" in the display information HJY is selected, the display information generation unit 16 may generate a display information HJZ shown in FIG. 8 and outputted it to the terminal device 200. FIG. 8 is a diagram illustrating an example of display information generated by the processing of the server device according to the first example embodiment.

According to the display information HJZ of FIG. 8, instead of the node "Garlic" in the display information HJY, the node "Dried parsley" is displayed in the foreground. Further, according to the display information HJZ of FIG. 8, instead of the node "Cheddar beer & Kielbasa soup" in the display information HJY, the node "Kielbasa & Sauerkraut" is displayed in the foreground.

According to the display switching as described above, it is possible to understand the reason why Kielbasa sausage is a new ingredient matching Christmas in a wide range of aspects. The display information generation unit 16 may change the icon according to the attribute of the node constituting the basis of the analysis result when performing the display switching as described above.

[Processing Flow]

Figure 9:
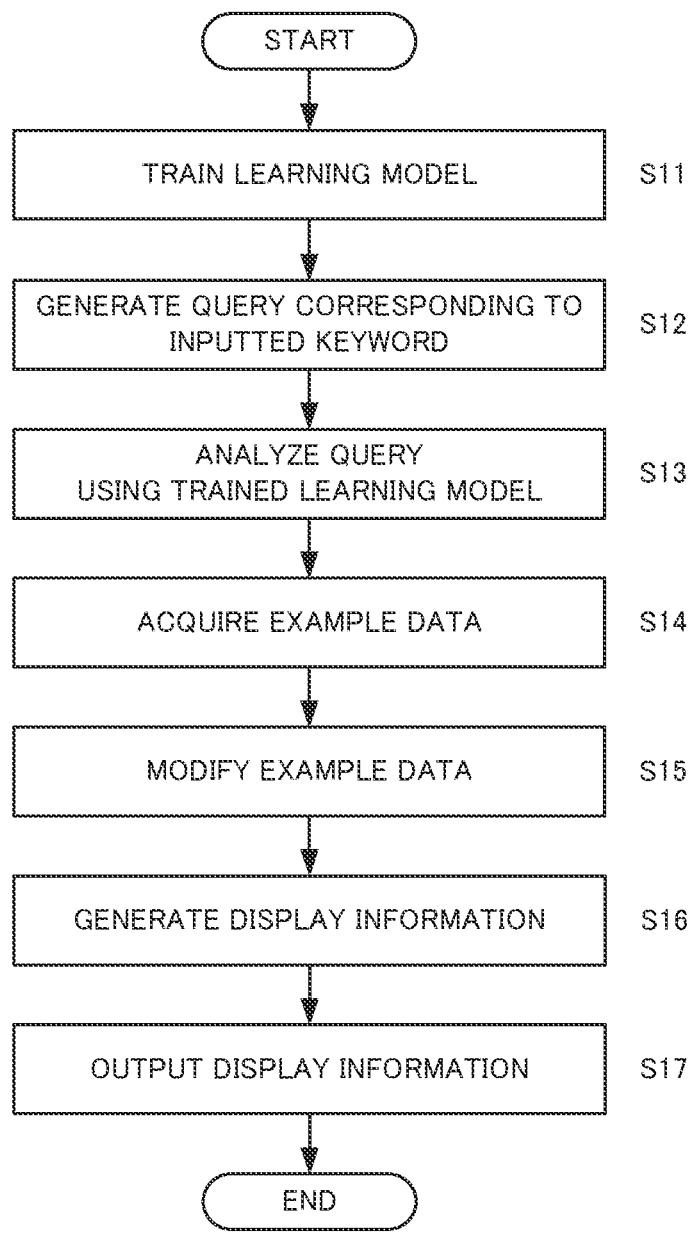
FIG. 9 is a flowchart illustrating an example of the processing performed in the server device according to the first example embodiment.

Subsequently, a flow of processing performed in the server device according to the first example embodiment will be described. FIG. 9 is a flowchart illustrating an example of processing that is performed in the server device according to the first example embodiment.

First, the server device 100 trains the learning model using the graph data stored in the graph data storage unit 11 and the relationship data indicating the known relationships between the linked nodes in the graph data (step S11).

Subsequently, the server device 100 generates a query corresponding to the keyword inputted from the terminal device 200 (step S12).

Subsequently, the server device 100 analyzes the query generated in step S12 using the trained learning model obtained in step S11 (step S13).

Subsequently, the server device 100 extracts the rules serving as the basis of the analysis result obtained in step S13 from the relationship data obtained in step S11. Further, the server device 100 identifies the part where the extracted rules are satisfied as described above, from the graph data read from the graph data storage unit 11 as described above, and acquires the example data corresponding to the data of the identified part (step S14).

Subsequently, the server device 100 classifies a plurality of nodes, which have the same relationship with each other and to which the same attribute data is given, among the nodes included in the example data obtained in step S14, into one node group. Further, the server device 100 modifies the example data obtained in step S14 so that the nodes belonging to the same node group classified as described above are arranged in an overlapping manner (step S15).

Subsequently, the server device 100 generates the display information by applying an icon corresponding to the attribute data of the node to each node arranged in the foreground in the modified example data obtained in step S15 (step S16).

Subsequently, the server device 100 outputs the display information generated in step S16 to the terminal device 200 (step S17).

As described above, according to the present example embodiment, it is possible to perform analysis for identifying contents optimized for the keyword inputted by a user using a trained learning model. Further, according to the present example embodiment, the analysis result obtained by the above-described analysis can be presented to the user together with the basis. Further, according to the present example embodiment, it is possible to generate a graph, in which icons corresponding to the individual attributes of the nodes are applied to the nodes constituting the above-described basis, as the display information. Therefore, according to the present example embodiment, the user can intuitively grasp the basis on which the content is presented to the user.

Incidentally, the present example embodiment can be applied to the field of marketing, for example, when the graph data including the nodes to which the attribute data indicating the attributes of the customer and the commodity are added is stored in the graph data storage unit 11. Further, the present example embodiment can be applied to the field of product manufacturing, for example, when graph data including nodes to which the attribute data indicating attributes such as parts and processes are given is stored in the graph data storage unit 11. Further, the present example embodiment can be applied to the field of medical diagnosis, for example, when the graph data including the nodes to which attribute data indicating attributes such as patient and symptom are given are stored in the graph data storage unit 11.

According to this example embodiment, for example, it is desirable that the learning model GMD is configured as a machine learning model.

Figure 10:
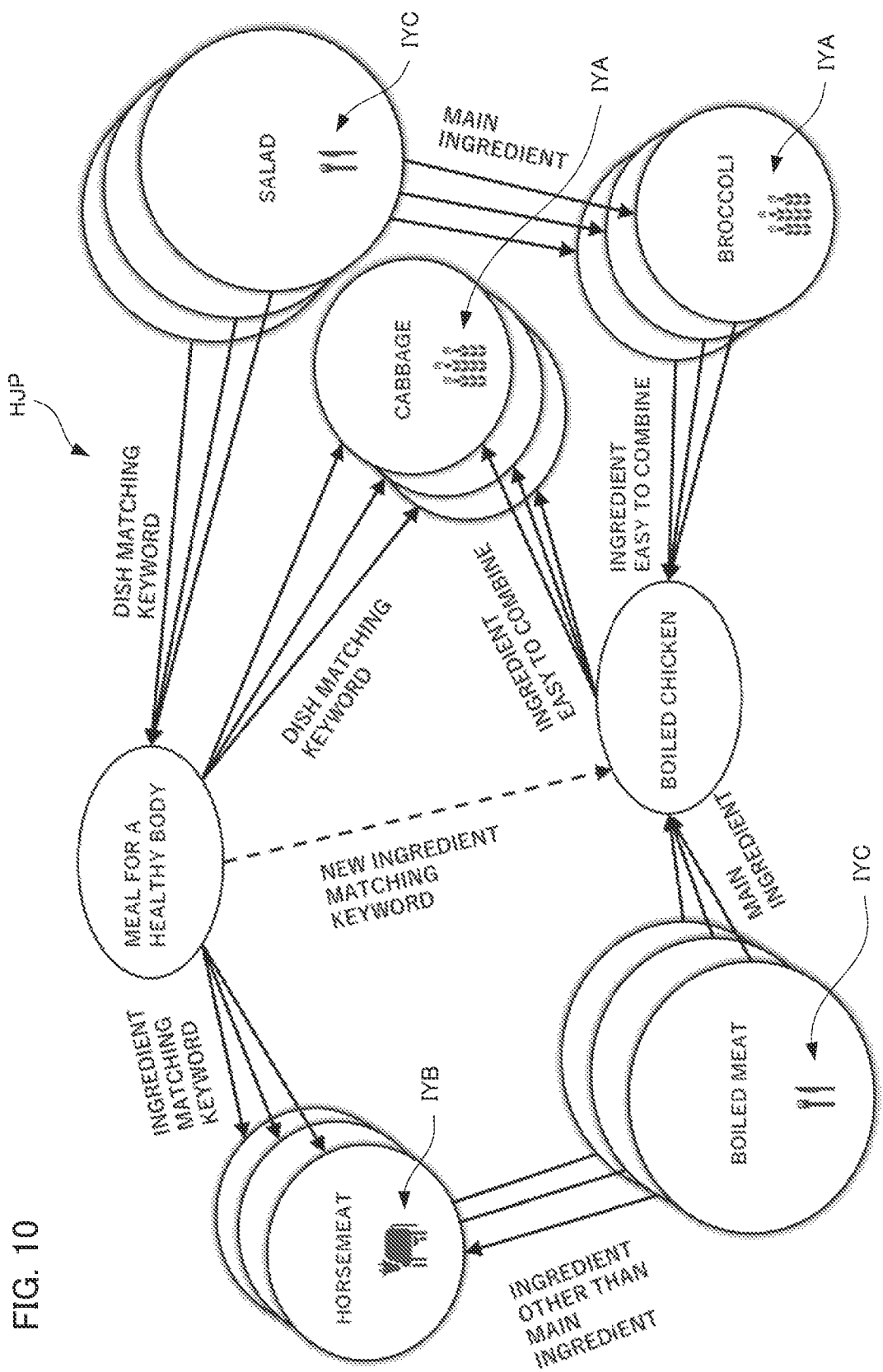
FIG. 10 shows another example of the display information generated by the processing of the server device according to the first example embodiment.

According to the present example embodiment, when a character string related to healthcare such as "A meal for a healthy body" is inputted as a keyword from the terminal device 200, the server device 100 can perform an analysis using the trained learning model GMD and obtain an analysis result that the optimum content for the keyword is "Boiled chicken". Further, according to the present example embodiment, the server device 100 can obtain the rules similar to the rules shown in the graph data GDX as the rules serving as the basis of the above-described analysis results. Further, the server device 100 can generate a display information HJP as shown in FIG. 10, for example, by performing processing based on the same rules as those shown in the graph data GDX. FIG. 10 is a diagram illustrating another example of display information generated by the processing of the server device according to the first example embodiment.

According to the display information HJP of FIG. 10, the icon IYA is applied to the nodes "Cabbage" and "Broccoli" whose attributes are vegetables. Further, according to the display information HJP of FIG. 10, the icon IYB is applied to the node "Horsemeat" whose attribute is meat. Further, according to the display information HJP of FIG. 10, the icon IYC is applied to the nodes "Salad" and "Boiled meat" whose attribute is dish. Further, according to the display information HJP of FIG. 10, it is possible to understand the reason why Boiled chicken is a new ingredient matching the meal for a healthy body, based on the nodes included in the display information HJP and the relationships between the nodes indicated by the solid line arrows in the display information HJP. That is, the server device 100 can be used for decision making related to healthcare of a user.

Second Example Embodiment

Figure 11:
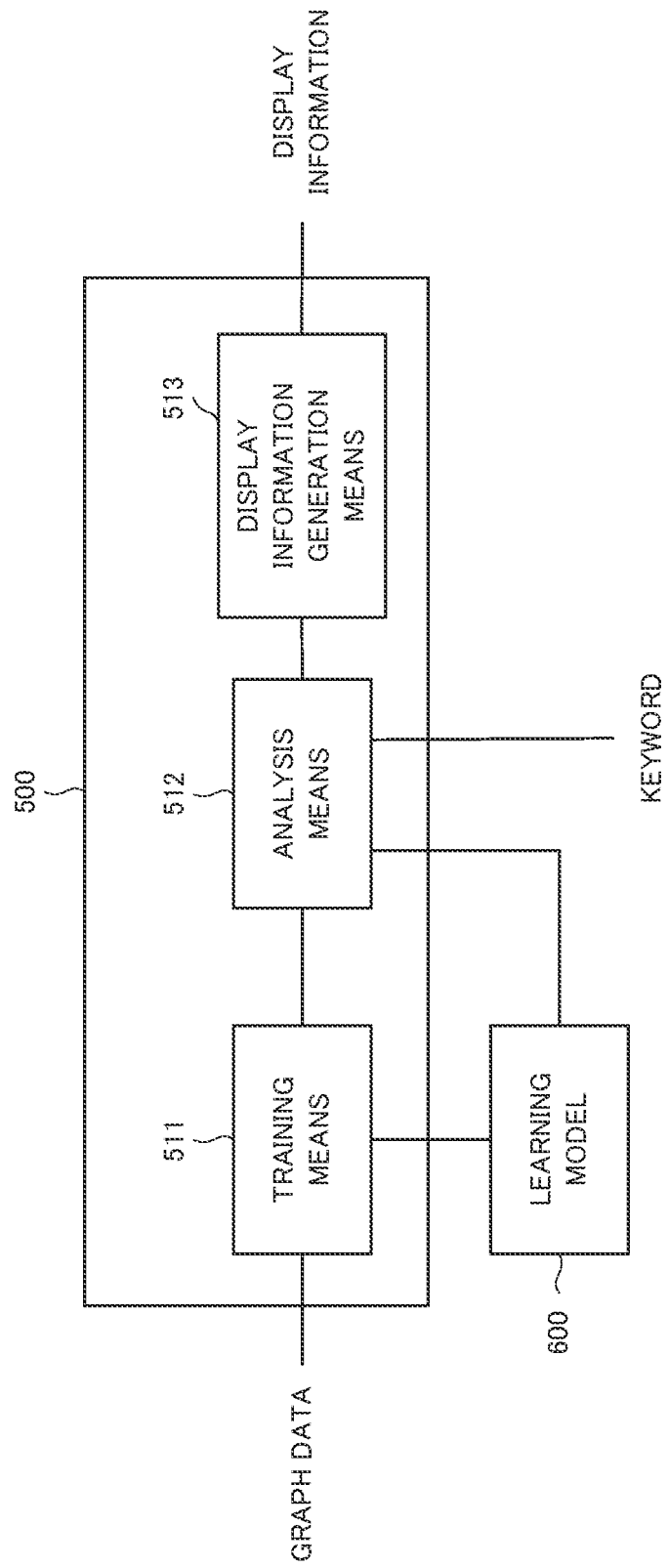
FIG. 11 is a block diagram showing a functional configuration of an information processing device according to a second example embodiment.

FIG. 11 is a block diagram illustrating a functional configuration of an information processing device according to a second example embodiment.

The information processing device 500 according to the present example embodiment has a hardware configuration similar to the server device 100. The information processing device 500 includes a training means 511, an analysis means 512, and a display information generation means 513.

FIG. 12 is a flowchart for explaining processing performed in the information processing device according to the second example embodiment.

The training means 511 trains a learning model using graph data and relationship data (step S51). The graph data includes a plurality of nodes corresponding to a plurality of contents, and the graph data is provided with attribute data indicating attributes of the plurality of nodes. The relationship data indicates known relationships between the nodes linked in the graph data.

The analysis means 512 performs an analysis for identifying contents optimized for a keyword inputted by a user, by using the trained learning model 600 (step S52).

The display information generation means 513 generates a graph for showing an analysis result obtained by the analysis together with a basis, and generates a display information in which an icon corresponding to the attribute of each node is applied to each node constituting the basis in the graph (step S53).

According to the present example embodiment, the user can intuitively grasp the basis on which the content is presented to the user.

A part or all of the example embodiments described above may also be described as the following supplementary notes, but not limited thereto.

Supplementary Note 1

An information processing device comprising:
a training means configured to train a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data;

an analysis means configured to perform an analysis for identifying contents optimized for a keyword inputted by a user, by using the trained learning model; and a display information generation means configured to generate a graph for showing an analysis result obtained by the analysis together with a basis, and generate a display information in which an icon corresponding to the attribute of each node is applied to each node constituting the basis in the graph.

Supplementary Note 2

The information processing device according to Supplementary note 1, wherein the display information generation unit acquires data of a part of the graph data where a relationship between the analysis result and the basis in the graph data is established, as an example data, based on the relationship data.

Supplementary Note 3

The information processing device according to Supplementary note 2, wherein the display information generating means acquires a classification result by classifying the nodes included in the example data based on a relationship between the nodes and attributes of the nodes, and generates the graph by modifying the example data so that the nodes belonging to one node group included in the classification result are arranged in an overlapping manner.

Supplementary Note 4

The information processing device according to Supplementary note 3, wherein the display information generation means generates the display information in which the icons corresponding to the attributes of the nodes arranged in a foreground of the graph are applied.

Supplementary Note 5

The information processing device according to Supplementary note 1, wherein the training means performs training of the learning model to derive unknown relationships between the nodes that are not linked in the graph data.

Supplementary Note 6

The information processing device according to Supplementary note 1,
wherein the learning model is configured as a machine learning model, and
wherein the keyword is a character string related to healthcare.

Supplementary Note 7

An information processing method comprising:
training a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data;
performing an analysis for identifying contents optimized for a keyword inputted by a user, by using the trained learning model; and
generating a graph for showing an analysis result obtained by the analysis together with a basis, and generate a display information in which an icon corresponding to an attribute of each node is applied to each node constituting the basis in the graph.

Supplementary Note 8

A recording medium storing a program, the program causing a computer to execute:
training a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data;
performing an analysis for identifying contents optimized for a keyword inputted by a user, by using the trained learning model; and
generating a graph for showing an analysis result obtained by the analysis together with a basis, and generate a display information in which an icon corresponding to an attribute of each node is applied to each node constituting the basis in the graph.

While the present disclosure has been described with reference to the example embodiments, the present disclosure is not limited to the above example embodiments and examples. Various changes which can be understood by those skilled in the art within the scope of the present disclosure can be made in the configuration and details of the present disclosure.

DESCRIPTION OF SYMBOLS

11 Graph data storage unit
12 Training processing unit
15 Analysis processing section
16 Display information generation unit
16A Example data acquisition unit
16B Classification processing unit
16C Icon applying unit
100 Server device

What is claimed is:
1. An information processing device comprising:
a memory storing instructions; and
one or more processors configured to execute the instructions to:
train a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data, and train the learning model to derive unknown relationship between the nodes that are not linked in the graph data based on the graph data and the relationship data;
generate a query corresponding to a keyword inputted by a user;
perform an analysis for identifying contents optimized for the query, by using the trained learning model;
generate a graph for showing an analysis result obtained by the analysis together with a basis; and
generate a display information in which an icon corresponding to the attribute of each node is applied to each node constituting the basis in the graph, wherein the one or more processors generate the display information by:
acquiring data of a part of the graph data where a relationship between the analysis result and the basis in the graph data is established, as an example data, based on the relationship data;
classifying, among the nodes included in the example data, a plurality of nodes which have same relationships with each other and to which same attribute data is given, as one node group;
generating the graph by modifying the example data so that the nodes belonging to one node group are arranged in an overlapping manner; and
applying the icons corresponding to the attributes of the nodes to the nodes arranged in a foreground of the graph.

2. The information processing device according to claim 1,
wherein the learning model is configured as a machine learning model, and
wherein the keyword is a character string related to healthcare.

3. An information processing method comprising:
training a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data, and training the learning model to derive unknown relationship between the nodes that are not linked in the graph data based on the graph data and the relationship data;
generating a query corresponding to a keyword inputted by a user;
performing an analysis for identifying contents optimized for the query, by using the trained learning model;
generating a graph for showing an analysis result obtained by the analysis together with a basis; and
generating a display information in which an icon corresponding to an attribute of each node is applied to each node constituting the basis in the graph,
wherein generating the display information comprises:
acquiring data of a part of the graph data where a relationship between the analysis result and the basis in the graph data is established, as an example data, based on the relationship data;
classifying, among the nodes included in the example data, a plurality of nodes which have same relationships with each other and to which same attribute data is given, as one node group;
generating the graph by modifying the example data so that the nodes belonging to one node group are arranged in an overlapping manner; and
applying the icons corresponding to the attributes of the nodes to the nodes arranged in a foreground of the graph.

4. A non-transitory computer-readable recording medium storing a program executable by a processor to perform processing comprising:
training a learning model using graph data and relationship data, the graph data including a plurality of nodes corresponding to a plurality of contents, the graph data being provided with attribute data indicating attributes of the plurality of nodes, the relationship data indicating known relationships between the nodes linked in the graph data, and training the learning model to derive unknown relationship between the nodes that are not linked in the graph data based on the graph data and the relationship data;
generating a query corresponding to a keyword inputted by a user;
performing an analysis for identifying contents optimized for the query, by using the trained learning model;
generating a graph for showing an analysis result obtained by the analysis together with a basis; and
generating a display information in which an icon corresponding to an attribute of each node is applied to each node constituting the basis in the graph,
wherein generating the display information comprises:
acquiring data of a part of the graph data where a relationship between the analysis result and the basis in the graph data is established, as an example data, based on the relationship data,
classifying, among the nodes included in the example data, a plurality of nodes which have same relationships with each other and to which same attribute data is given, as one node group,
generating the graph by modifying the example data so that the nodes belonging to one node group are arranged in an overlapping manner, and
applying the icons corresponding to the attributes of the nodes to the nodes arranged in a foreground of the graph.

* * * * *